(No Model.)
F. B. GOULD.
MICROSCOPIC PHOTOGRAPHIC TRANSPARENCY.
No. 271,838.      Patented Feb. 6, 1883.
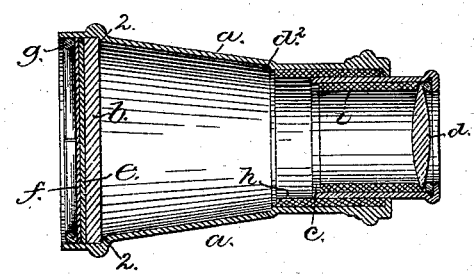
Witnesses.
John F. C. Brunkert
Bernice J. Noyes.
Inventor:
Forrest B. Gould
by Crosby & Gregory
Attys.
N. PETERS, Photo-Lithographer, Washington, D. C.

UNITED STATES PATENT OFFICE.

FORREST B. GOULD, OF BOSTON, MASSACHUSETTS.

MICROSCOPIC PHOTOGRAPHIC TRANSPARENCY.

SPECIFICATION forming part of Letters Patent No. 271,838, dated February 6, 1883.

Application filed January 28, 1882. (No model.)

*To all whom it may concern:*

Be it known that I, FORREST B. GOULD, of Boston, county of Suffolk, State of Massachusetts, have invented an Improvement in Microscopic Photographic Transparencies, of which the following description, in connection with the accompanying drawings, is a specification.

Heretofore in the arts microscopic photographic transparencies for watch-chains, &c., have been made by cementing a picture upon the end of a prolonged glass lens, which prevented the employment of a picture of larger size than the diameter of the said lens, and the picture thereon is not exhibited as in stereoscopic relief, but appears to the eye flat, as when viewing with the naked eye an ordinary card-photograph. I have discovered by experiment that the optical results in such devices are greatly improved by placing the microscopic picture on a separate piece of plain glass at the outer end of a case or shell which is made conical internally, the said picture being held at the larger end of the said case or shell, and at such distance from the lens, which is located and made adjustable in suitable manner at the small end of the case or shell, as to insure the proper focal distance between the lens and picture.

The drawing represents in longitudinal section an apparatus embodying my invention.

The tube or case $a$, made preferably of metal, because of strength and cheapness, has near and just within its large end a shoulder or seat, 2, to receive the thin piece of glass $b$, upon which has been formed the photographic image which it is desired to display. From the shoulder backward to near the end of the cylindrical extension of the lens-holder $c$ the interior of the said case or shell is made like a cone, growing smaller as it approaches the lens $d$, its smallest diameter being at $d^2$. The lens is held in a suitable manner in the end of the lens-holder, and preferably the said lens-holder will be made adjustable in and removable from the case or shell to thus enable the lens to be placed at the desired or necessary distance from the picture on the glass $b$, to adapt the apparatus to the eye of the user, and so, also, to permit the removal of dust from the case.

By placing the glass having upon it the picture at the large end of a conical case or shell, and the lens at a distance from it and at the small end of the case, I am enabled to exhibit a picture occupying an area on the said glass of greater extent than the area of the lens, and by separating the lens and glass $b$ from each other, as described and shown, the glass containing the picture being at the larger end of the conical case, it is possible to enlarge the field of vision and improve the optical result.

The picture to be displayed will be placed on that side of the glass $b$ next to the magnifying-lens $d$, and at the opposite side of the said glass I place a semi-transparent or opalescent screen, $e$, preferably, for cheapness, composed of paper enameled on one side with albumen or other suitable material, and beyond the said paper, if the latter be used, I place a disk, $f$, of glass or transparent gelatine to protect the paper, and I hold the glass, the screen, and the disk in place in the case or shell by means of a ring, $g$, or other suitable holder.

When the picture does not cover the entire field of the glass $b$, I have found that the margin about the field of the picture, as the light passes through it, seems to give distance to the picture, for the glass upon which the picture is taken is magnified as to its thickness by the action of the lens. The magnified space between the picture and screen gives an appearance of perspective to the picture.

I do not broadly claim a lens placed at one end of a tube and a picture and glass near its other end, as in United States Patent No. 33,031. Nor do I claim a microscope with a transparent or glass case. Nor do I claim a microscope with ground glass at its large end, for when the microscope is of glass the passage of light through the sides of the case destroys the effect I aim to attain, and when the ground glass is used at the large end of the microscope the illuminating-power is so strong as to make the picture appear flat, and, also, the rough surface of the glass being magnified, gives the picture an appearance of coarseness.

The lens-holder is shown as fitted closely within a cylindrical washer, $h$, the friction of the said washer keeping the lens-holder in adjustable position, and the lens $d$ is shown as held in place by a washer, $i$.

I claim—

As an improved article of manufacture, a case or shell having the metallic conical interior and provided at its large end with a picture and a piece of enameled paper for a screen and at its small end with a lens to magnify the said picture, the said picture and glass being confined within the walls of the case, substantially as shown and described.

In testimony whereof I have signed my name to this specification in the presence of two subscribing witnesses.

FORREST B. GOULD.

Witnesses:
G. W. GREGORY,
W. H. SIGSTON.